(12) United States Patent
Lai

(10) Patent No.: US 6,678,318 B1
(45) Date of Patent: Jan. 13, 2004

(54) METHOD AND APPARATUS FOR TIME-DOMAIN EQUALIZATION IN DISCRETE MULTITONE TRANSCEIVERS

(75) Inventor: Yhean-Sen Lai, Warren, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/481,027

(22) Filed: Jan. 11, 2000

(51) Int. Cl.[7] .................. H03H 7/30; H03H 7/40; H03K 5/159
(52) U.S. Cl. .................. 375/232; 375/350; 708/323
(58) Field of Search .................. 375/229, 232, 375/233, 230, 234, 346, 350; 708/300, 322, 323

(56) References Cited

U.S. PATENT DOCUMENTS

| | | | |
|---|---|---|---|
| 6,320,901 B1 * | 11/2001 | Arad et al. .................. | 375/222 |
| 6,396,886 B1 * | 5/2002 | Kapoor .................. | 375/350 |
| 6,408,022 B1 * | 6/2002 | Fertner .................. | 375/230 |
| 6,549,512 B2 * | 4/2003 | Wu et al. .................. | 370/210 |
| 2001/0036237 A1 * | 11/2001 | Storm et al. .................. | 375/350 |

* cited by examiner

Primary Examiner—Jean B. Corrielus
(74) Attorney, Agent, or Firm—Synnestvedt & Lechner LLP

(57) ABSTRACT

The invention is a method and apparatus for determining the coefficients to be used by a time domain equalization circuit in a receiver in a communication system using discrete multitone (DMT) technology. The method and apparatus is particularly efficient in that the order of the channel response equation after channel shortening is less than or equal to the allotted cyclic prefix length utilized in the applicable communication protocol being used. Further, the invention includes an efficient method and apparatus for determining symbol synchronization for the time domain equalization.

38 Claims, 5 Drawing Sheets

METHOD AND APPARATUS FOR TIME-DOMAIN EQUALIZATION IN DISCRETE MULTITONE TRANSCEIVERS

FIELD OF INVENTION

The invention pertains to transceivers and modems. More particularly, the invention pertains to asymmetric digital subscriber line (ADSL) modems used to achieve very high speed data communication via telephone networks.

BACKGROUND OF THE INVENTION

There is an ever present desire to maximize the speed of digital communications via networks, and particularly telecommunication networks, such as public telephone systems. Accordingly, telecommunication network providers now offer to their customers many options for coupling to the telephone network in addition to the standard analog based connection commonly referred to as POTS (Plain Old Telephone System). Some of the options that are widely available are integrated services digital network (ISDN), T-1 lines, E-1 lines, digital subscriber lines (DSL) and asymmetric digital subscriber lines (ADSL). ADSL's can provide very high data speeds such as on the order of several megabits per second, over a standard twisted wire pair. Unlike the traditional data modems used for analog communication with a telephone central office via a twisted wire pair, ADSL requires modems both at the subscriber end and at the telephone company Central Office end. Current ADSL systems employ discrete multitone (DMT) technology to implement high bandwidth communications, such as for digital TV broadcast, on demand video, high speed video based internet access, work at home digital file transfer, teleconferencing, home shopping, and information services over existing twisted wire pair telephone lines.

The international telecommunications union (ITU) has promulgated a standard for ADSL that is commonly termed G.lite and which is set forth in ITU-T specification G.992.2, incorporated herein by reference. Another standard promulgated by ANSI is commonly termed Heavy ADSL and is set forth in ANSI specification T1.413, issue 2, also incorporated herein by reference. G.lite has 256 samples with 128 tones (32 tones for upstream communications), each tone having a real and imaginary portion. G.lite uses a cyclic prefix of length 16 samples. Heavy ADSL has 512 samples with 256 tones (32 tones for upstream communications), each tone having a real and imaginary portion. Heavy ADSL utilizes a cyclic prefix of length 32 samples.

FIG. 1A is a block diagram of the basic ADSL modem functions in accordance with ITU-T G.992.2 with 256 samples per symbol. The upper half of the diagram represents functions in the transmit direction while the lower half represents functions in the receive direction.

In the transmit direction, digital data is generated in block 102. That data is processed through a scrambler 104 and then through a forward error correction (FEC) encoder 106 which adds syndrome bytes to the data that will be used for error correction by the receiver at the receiving terminal. Next, as shown in block 108, the transmit data is encoded using quadrature amplitude modulation (QAM). The data is then converted from the frequency domain to the time domain via inverse fast fourier transform (IFFT) 110.

A 1:4 interpolator 112 interpolates the output of IFFT block 110 to produce 256 samples from the 64 samples output from block 110. A cyclic prefix is added to each frame in block 114. The cyclic prefix comprises data added between the symbols to avoid inter symbol interference (ISI). The cyclic prefix is of a standardized length, e.g., 16 samples for ITU-T G922.2 or 32 samples for ANSI-T1.413, issue 2, and is removed at the receiver to recreate the original transmitted data. The data is then forwarded to a coder/decoder (CODEC) 116. The CODEC encodes the data for transmission over the twisted wire pair to the receiving device.

In the receiver portion of the transceiver 100, the received signal is passed from the twisted wire pair through the CODEC 116 where it is decoded. It is then passed to a time domain equalizer (TEQ) 118 to shorten the channel impulse response. Then, in 120, the cyclic prefix is removed. Next, an echo canceller (EC) 134 creates an echo cancellation signal based on the transmit signal which is subtracted by subtractor 121 from the receive signal in order to cancel any echo of the transmit signal that might return over the twisted wire pair and interfere with the receive signal. The echo compensated signal is converted back to the frequency domain by fast fourier transform (FFT) in 122. Then, in 124, frequency domain equalization (FEQ) is employed to compensate for the channel distortion and inter symbol interference (ISI). The receive signal is then processed through a quadrature amplitude modulation decoder (QAM) 126 to decode the tone signal into digital data. That is followed by forward error correction (FEC) 128 which uses the syndrome bits that are added by the transmit path FEC encoder 106 to perform forward error correction. Finally, the data is descrambled to extract the true data signal in 130 and then forwarded to the receiver 132.

FIG. 1B is a block diagram of the basic modem functions in accordance with ANSI-T1.413, issue 2. Note that the functions are similar to those for ITU-T G.992.2. Notable differences include that the receive path FFT 122a is a 512 (rather than 256) point FFT and the transmit path interpolator 112a is a 1:8 interpolator (rather than a 1:4 interpolator). Both differences are a result of the different number of samples between the two protocols.

FIG. 2 is a block diagram which helps illustrate time domain equalization in DMT in more detail. In particular, block 202 encompasses functions performed at the transmitter. Block 207 encompasses functions that occur in the data channel and block 212 encompasses functions performed at the receiver. Block 206 encompasses those functions which result in channel shortening. Thus, it can be seen that, in the transmitter 202, a DMT signal, x(n), is generated for transmission via the channel. The channel 207 has a channel impulse response, h(n), represented by block 208. Accordingly, the signal, y(n), received at the receiver 212 is the convolution of the original signal x(n) and the channel response h(n), i.e.;

$$y(n)=x(n)*h(n) \qquad \text{Eq. (1)}$$

The time domain equalization circuit 118 in the receiver 212 convolves the received signal, y(n), with a coefficient 1+a(n). The output y'(n) from the time domain equalization domain circuit 118 therefore is:

$$y'(n)=y(n)*(1+a(n))=x(n)*(h(n)*(1+a(n))) \qquad \text{Eq. (2)}$$

The TEQ circuit 118 shortens the channel by the length of the cyclic prefix, e.g., 16 samples for G.lite or 32 samples for Heavy ADSL. Then the cyclic prefix is removed from the signal y'(n), as shown in block 120 in FIG. 1. If we call h'(n) the channel impulse response corresponding to the shortened channel, then h'(n)=h(n)*(1+a(n)).

If the impulse response length of the channel after shortening (hereinafter the shortened channel length, M) is less than or equal to the length, L, of the cyclic prefix, i.e., $M \leq L$, then each y'(n) will have no dependency on any transmitted samples before x(n−L).

After the cyclic prefix is removed, the actual symbol (without inter symbol interference) should remain. However, if $M \leq L$, then the sampling signal y(n) is dependent on the transmit sampling signal that appears before x(n−L) and, thus, the removal of the cyclic prefix would not prevent inter symbol interference and thus degrade the performance of the transceiver. Hence, it is desirable to design an efficient TEQ shortening filter, 1+a(n), that makes $M \leq L$ and for which the energy in the channel impulse response h'(n) is as small as possible for $n \geq L$ and as large as possible for n<L.

SUMMARY OF THE INVENTION

The invention is a method and apparatus for determining the coefficients to be used by a time domain equalization circuit in a receiver in a communication system using a discrete multitone (DMT) protocol. The method and apparatus is particularly efficient in that the order of the channel response equation after channel shortening is less than or equal to the allotted cyclic prefix length utilized in the communication protocol. Further, the invention includes an efficient method and apparatus for determining symbol synchronization for the time domain equalization.

More particularly, the invention is a method and apparatus for generating coefficients for performing time domain equalization on a digital multitone signal involving (1) synchronizing the received DMT signal to a corresponding signal that was transmitted from said transmitter prior to inclusion of any channel response, (2) determining time domain equalization coefficients via $$(R_{xy}^T R_{xx}^{-1} R_{xy} - R_{yy}) a_{opt} = r_2 - (R_{xy}^T R_{xx}^{-1} r_1)$$

or $$a_{opt} = (R_{xy}^T R_{xx}^{-1} R_{xy} - R_{yy})^{-1} (r_2 - R_{xy}^T R_{xx}^{-1} r_1).$$

where $$R_{xx}(k) = E\{x(n)x(n+k)\} = R_{xx}(-k)$$

$$R_{xy}(k) = E\{x(n)y(n+k)\} = R_{yx}(-k)$$

$$R_{yy}(k) = E\{y(n)y(n+k)\} = R_{yy}(-k)$$

$$r = E\{y(n)W(n)\} = \begin{bmatrix} r_1 \\ r_2 \end{bmatrix};$$

and

T represents a transpose function; and (3) time domain equalizing the received signal using said determined coefficients.

DETAILED DESCRIPTION OF THE INVENTION

Figure 1A:
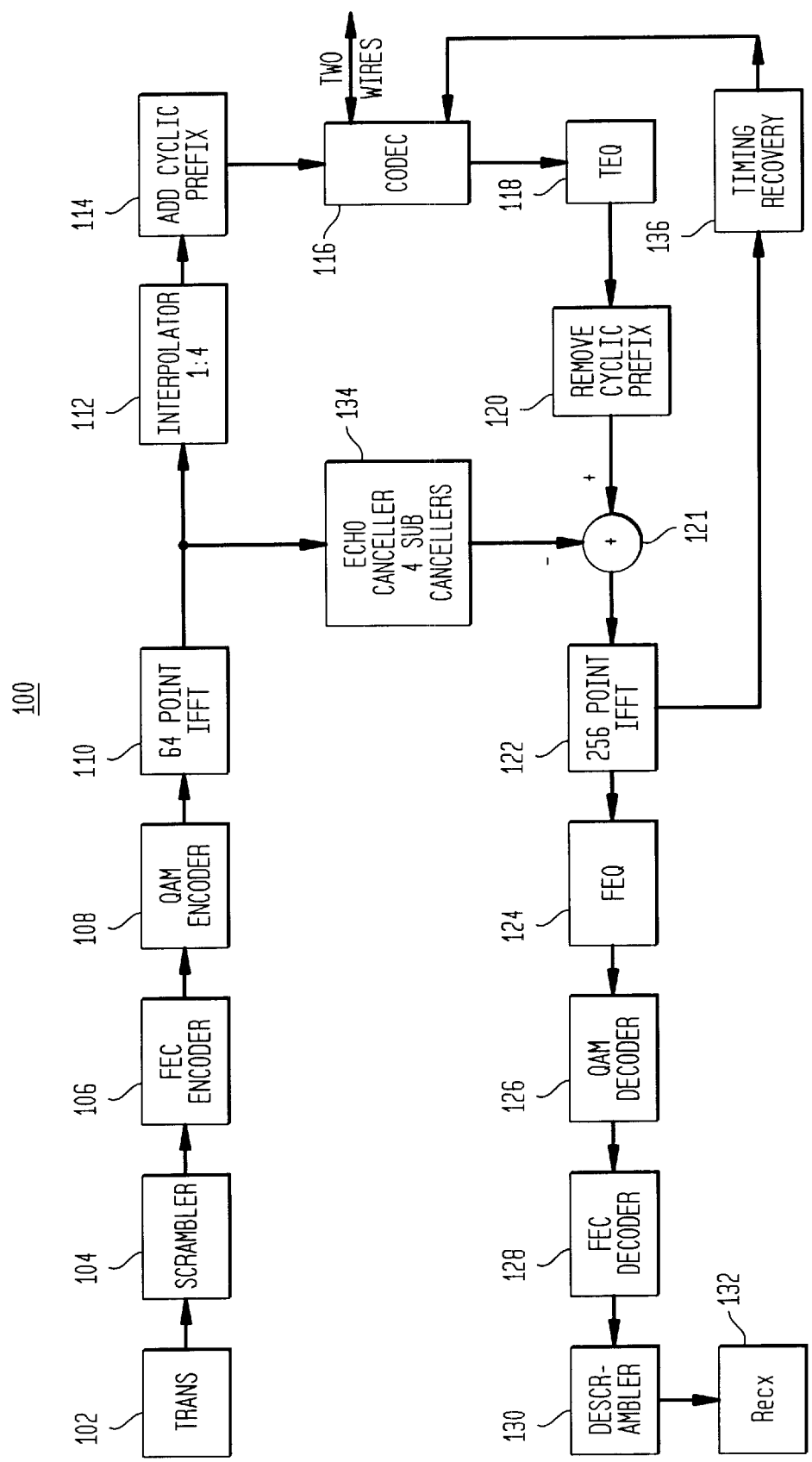
FIG. 1A is a block diagram illustrating the functions of an ADSL modem transceiver in accordance with ITU-T G 992.2.

The goal of the present invention is to design a TEQ shortening filter that produces a new overall channel response h'(n) for which $M \leq L$.

The impulse response h(n) of the channel has the transfer function:

$$H(z) = \frac{B(z)}{A(z)} = \frac{b_0 + b_1 z^{-1} + b_2 z^{-2} + \ldots + b_{(L-1)} z^{-(L-1)}}{1 + a_1 z^{-1} + a_2 z^{-2} + \ldots + a_{(K-1)} z^{-(K-1)}} \quad \text{Eq. (3)}$$

where L is the length of the cyclic prefix, K is the length of the TEQ filter having impulse response (1+a(n)) or A(z). In accordance with equation 3, the transfer function of the shortened channel is:

$$H'(z) = A(z)H(z) = b_0 + b_1 z^{-1} + b_2 z^{-2} + \ldots + b_{(L-1)} z^{-(L-1)} \quad \text{Eq. (4)}$$

Thus, the length, M, of the shortened impulse response shall be set equal to the length of the cyclic prefix, L, in order to eliminate ISI between two consecutive symbols by removing the cyclic prefix to improve the overall performance of the transceiver.

Let $$I = [b_0 b_1 b_2 \ldots b_{(L-1)} -a_1 -a_2 \ldots -a_{(K-1)}]^T = [b -a]^T \quad \text{Eq. (5)}$$

and $$W(n) = [x(n)x(n-1)x(n-2) \ldots x(n-(L-1))y(n-1)y(n-2) \ldots y(n-(K-1))]^T \quad \text{Eq. (6)}$$

where T denotes the transpose of a matrix. From equations (3) through (6), the estimated signal, $\tilde{y}(n)$, at the receiver is:

$$\tilde{y}(n) = I^T W(n) \quad \text{Eq. (7)}$$

and the error is:

$$e(n) = y(n) - \tilde{y}(n) \quad \text{Eq. (8)}$$

From the well known LMS (Least Mean Square) error algorithm, the optimal solution $I_{opt}$ is $$RI_{opt} = r \quad \text{Eq. (9)}$$

where $$R = E\{W(n)W^T(n)\} \quad \text{Eq. (10)}$$

$$r = E\{y(n)W(n)\} \quad \text{Eq. (11)}$$

E{ } in the equations above represents a generalized averaging function or an ensemble average. $I_{opt}$ must be generated before a value for a can be found.

Let $$R_{xx}(k) = E\{x(n)x(n+k)\} = R_{xx}(-k) \quad \text{Eq. (12)}$$

$$R_{xy}(k) = E\{x(n)y(n+k)\} = R_{yx}(-k) \quad \text{Eq. (13)}$$

$$R_{yy}(k) = E\{y(n)y(n+k)\} = R_{yy}(-k) \quad \text{Eq. (14)}$$

With equations (9) to (14), we have $$\begin{bmatrix} R_{xx}(0) & R_{xx}(1) & R_{xx}(2) & \ldots & R_{xx}(L-1) & R_{xy}(-1) & R_{xy}(-2) & \ldots & R_{xy}(-(K-1)) \\ R_{xx}(1) & R_{xx}(0) & R_{xx}(1) & \ldots & R_{xx}(L-2) & R_{xy}(0) & R_{xy}(-1) & \ldots & R_{yy}(-(K-2)) \\ R_{xx}(2) & R_{xx}(1) & R_{xx}(0) & \ldots & R_{xx}(L-3) & R_{xy}(1) & R_{xy}(0) & \ldots & R_{xy}(-(K-3)) \\ \ldots & \ldots & \ldots & & \ldots & \ldots & \ldots & & \\ \ldots & \ldots & \ldots & & \ldots & \ldots & \ldots & & \\ R_{xx}(L-1) & R_{xy}(L-2) & \ldots & \ldots & R_{xx}(0) & R_{xy}(L-2) & \ldots & \ldots & R_{xy}(L-K) \\ R_{xy}(-1) & R_{xy}(0) & \ldots & \ldots & R_{xy}(L-2) & R_{yy}(0) & R_{yy}(1) & \ldots & R_{xy}(L-2) \\ R_{xy}(-2) & R_{xy}(-1) & \ldots & \ldots & Rxy(L-3) & R_{yy}(1) & R_{yy}(0) & \ldots & R_{yy}(K-3) \\ \ldots & \ldots & & & \ldots & \ldots & \ldots & & \\ \ldots & \ldots & & & \ldots & \ldots & \ldots & & \\ R_{xy}(-(K-1)) & R_{xy}(-(K-2)) & \ldots & & R_{xy}(-(K-L)) & R_{yy}(K-2) & R_{yy}(K-3) & \ldots & R_{yy}(0) \end{bmatrix} \begin{bmatrix} b_0 \\ b_1 \\ b_2 \\ \\ \\ b_{L-1} \\ -a_1 \\ -a_2 \\ \\ \\ -a_{K-2} \end{bmatrix} = \begin{bmatrix} R_{xx}(0) \\ R_{xy}(1) \\ R_{xy}(2) \\ \\ \\ R_{xy}(L-1) \\ R_{yy}(1) \\ R_{yy}(2) \\ \\ \\ R_{yy}(K-1) \end{bmatrix}$$
Eq. (15)

Equation (15) can be rewritten as $$\begin{bmatrix} R_{xx} & R_{xy} \\ R_{xy}^T & R_{yy} \end{bmatrix} \begin{bmatrix} b_{opt} \\ -a_{opt} \end{bmatrix} = \begin{bmatrix} r_1 \\ r_2 \end{bmatrix}$$
Eq. (16)

where $$R_{xx} = \begin{bmatrix} R_{xx}(0) & R_{xx}(1) & R_{xx}(2) & \ldots & R_{xx}(L-1) \\ R_{xx}(1) & R_{xx}(0) & R_{xx}(1) & \ldots & R_{xx}(L-2) \\ & \ldots & \ldots & & \\ R_{xx}(L-1) & R_{xx}(L-2) & \ldots & \ldots & R_{xx}(0) \end{bmatrix}$$
Eq. (17)

$$R_{xx} = \begin{bmatrix} R_{yy}(0) & R_{yy}(1) & R_{yy}(2) & \ldots & R_{yy}(K-2) \\ R_{yy}(1) & R_{yy}(0) & R_{yy}(1) & \ldots & R_{yy}(K-3) \\ & \ldots & \ldots & & \\ R_{yy}(K-2) & R_{yy}(K-3) & \ldots & \ldots & R_{yy}(0) \end{bmatrix}$$
Eq. (18)

$$R_{xy} = \begin{bmatrix} R_{xy}(-1) & R_{xy}(-2) & R_{xy}(-3) & \ldots & R_{xy}(-(K-1)) \\ R_{xy}(0) & R_{xy}(-1) & R_{xy}(-2) & \ldots & R_{xy}(-(K-2)) \\ & \ldots & \ldots & \ldots & \\ R_{xy}(L-2) & R_{xy}(L-3) & \ldots & \ldots & R_{xy}(L-K) \end{bmatrix}$$
Eq. (19)

$$r_1 = [R_{xy}(0) R_{xy}(1) R_{xy}(2) \ldots R_{xy}(L-1)]^T$$
Eq. (20)

and $$r_2 = [R_{yy}(1) R_{yy}(2) R_{yy}(3) \ldots R_{yy}(K-1)]^T$$
Eq. (21)

In the equations above, $R_{xx}$ and $R_{yy}$ are positive definite symmetric matrices with the dimensions L×L and (K−1)×(K−1), respectively. $R_{xy}$, $r_1$ and $r_2$ are L×(K−1), L×1 and (K−1)×1 matrices, respectively. We are interested in finding the coefficients of A(z), that is $a_{opt}$. Hence, from equation (16), we have $$R_{xx}b_{opt} - R_{xy}a_{opt} = r_1$$
Eq. (22)

$$R_{xy}^T b_{opt} - R_{yy}a_{opt} = r_2.$$
Eq. (23)

From equation (22), we can solve $b_{opt}$ as $$b_{opt} = R_{xx}^{-1}(r_1 + R_{xy}a_{opt})$$
Eq. (24)

By substituting equation (24) into equation (23), we have $$(R_{xy}^T R_{xx}^{-1} R_{xy} - R_{yy})a_{opt} = r_2 - (R_{xy}^T R_{xx}^{-1} r_1)$$

or $$a_{opt} = (R_{xy}^T R_{xx}^{-1} R_{xy} - R_{yy})^{-1}(r_2 - R_{xy}^T R_{xx}^{-1} r_1).$$
Eq. (25)

Equation (25) can be solved in several ways. In order to reduce computation time and memory usage, some conditions will be considered and some matrices can be pre-calculated and stored in a table. In equation (25), $R_{xx}$ is an autocorrelation of the training signal x(n) that is pre-defined in ITU-T G.992.2 and is a positive definite symmetric matrix. Hence, the matrix $(R^T_{xy}R_{xx}^{-1}R_{xy}-R_{yy})$ also is a positive definite matrix. The implementation for equation (25) can be summarized as follows:

(A) Since $R_{xx}^{-1}$ is a positive definite matrix, it can be rewritten as $R_{xx}^{-1}=V^T D_{inv}V$, where $V^T$ is a lower triangular matrix whose main diagonal elements are all 1's, and $D_{inv}$ is a diagonal matrix. These matrices can be pre-calculated and stored in a table. Only L(L−1)/2 locations are needed to store the V matrix and L locations are needed to store the $D_{inv}$ matrix. Hence, equation (25) becomes $$(R_{xy}^T V^T D_{inv} V R_{xy} - R_{yy})a_{opt} = r_2 - (R_{xy}^T V^T D_{inv} V r_1)$$

or $$((VR_{xy})^T D_{inv} VR_{xy} - R_{yy})a_{opt} = r_2 - ((VR_{xy})^T D_{inv} V r_1)$$
Eq. (26)

(B) The matrix $VR_{xy}$ which appears 3 times in equation (26) can be computed once and used in all three instances. The matrix $F=((VR_{xy})^T D_{inv} VR_{xy} - R_{yy})$ in equation (26) is a (K−1)×(K−1) positive definite matrix.

(C) By employing the Cholesky decomposition method (L. R. Rabiner and R. W/ Schafer, "Digital Processing of Speech Signals", Prentice-Hall, Inc., Englewood Cliffs, N.J., 1978), equation (26) can be solved for $a_{opt}$.

Equation (3) is a general formula that covers cases of causality than can occur in the real world. Depending on the behavior of a particular design, the transfer function may alternately be written as:

$$H(z) = \frac{B(z)}{A(z)} = \frac{1 + b_1 z^{-1} + b_2 z^{-2} + \ldots + b_{(L-1)}z^{-(L-1)}}{a_0 + a_1 z^{-1} + a_2 z^{-2} + \ldots + a_{(k-1)}z^{-(k-1)}}$$
Eq. (3a)

and the error e(n) that is to be minimized may be written as:

$$e(n) = x(n) - \tilde{x}(n)$$
Eq.(8a)

where $\tilde{x}$ is the estimated signal at the receiver. The same concepts described above to arrive at Eq. (25) based on Eq. (3) can be used with respect to Eq. (3a) to derive a similar solution.

Figure 1B:
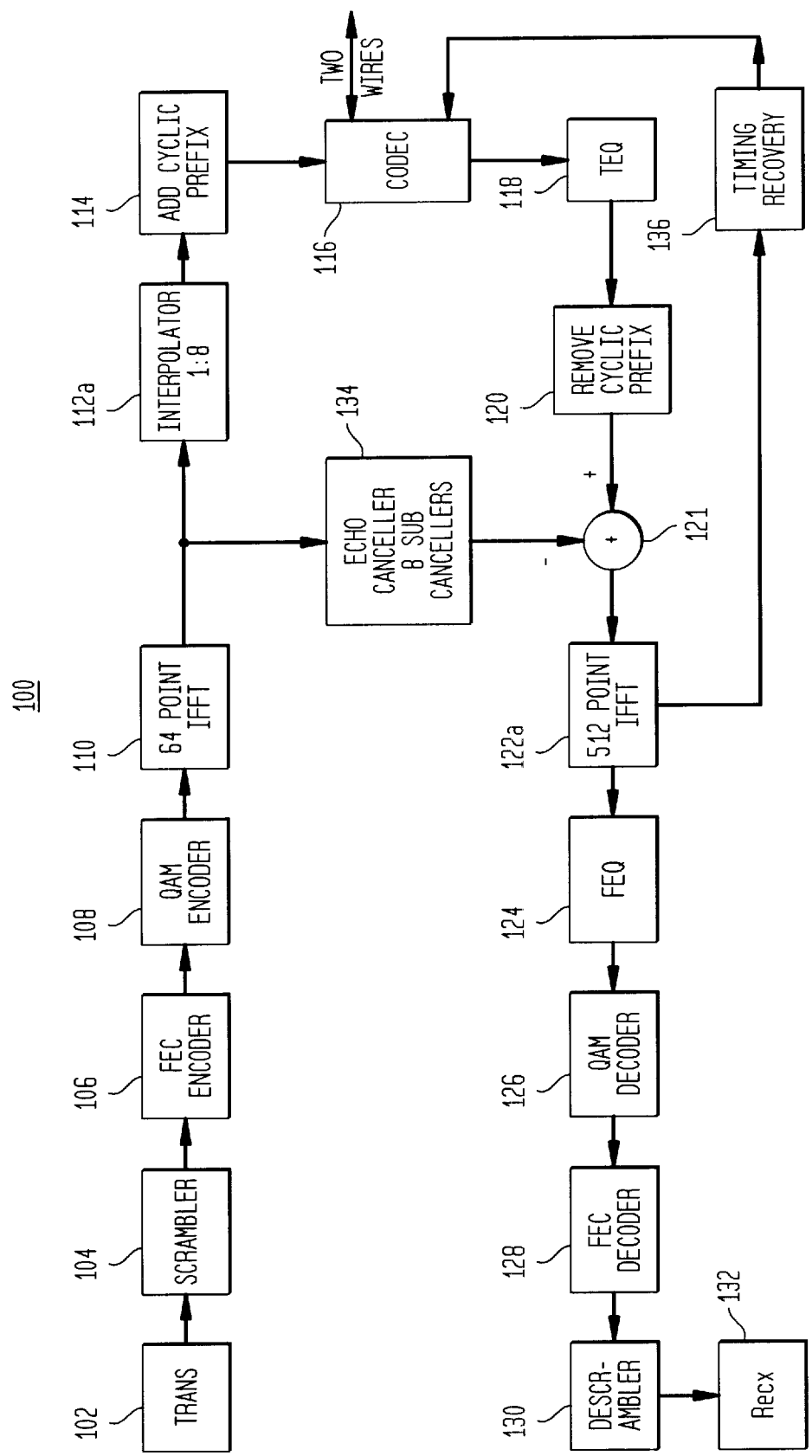
FIG. 1B is a block diagram illustrating the functions of an ADSL modem transceiver in accordance with ANSI-T1.413, issue 2.
Figure 2:
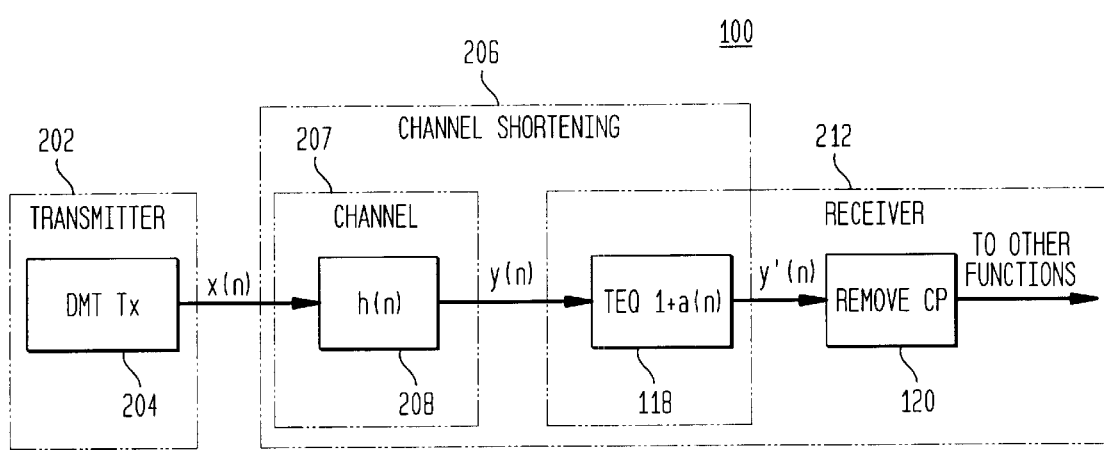
FIG. 2 is a block diagram illustrating in more detail channel shortening in discrete multitone communications.
Figure 3:
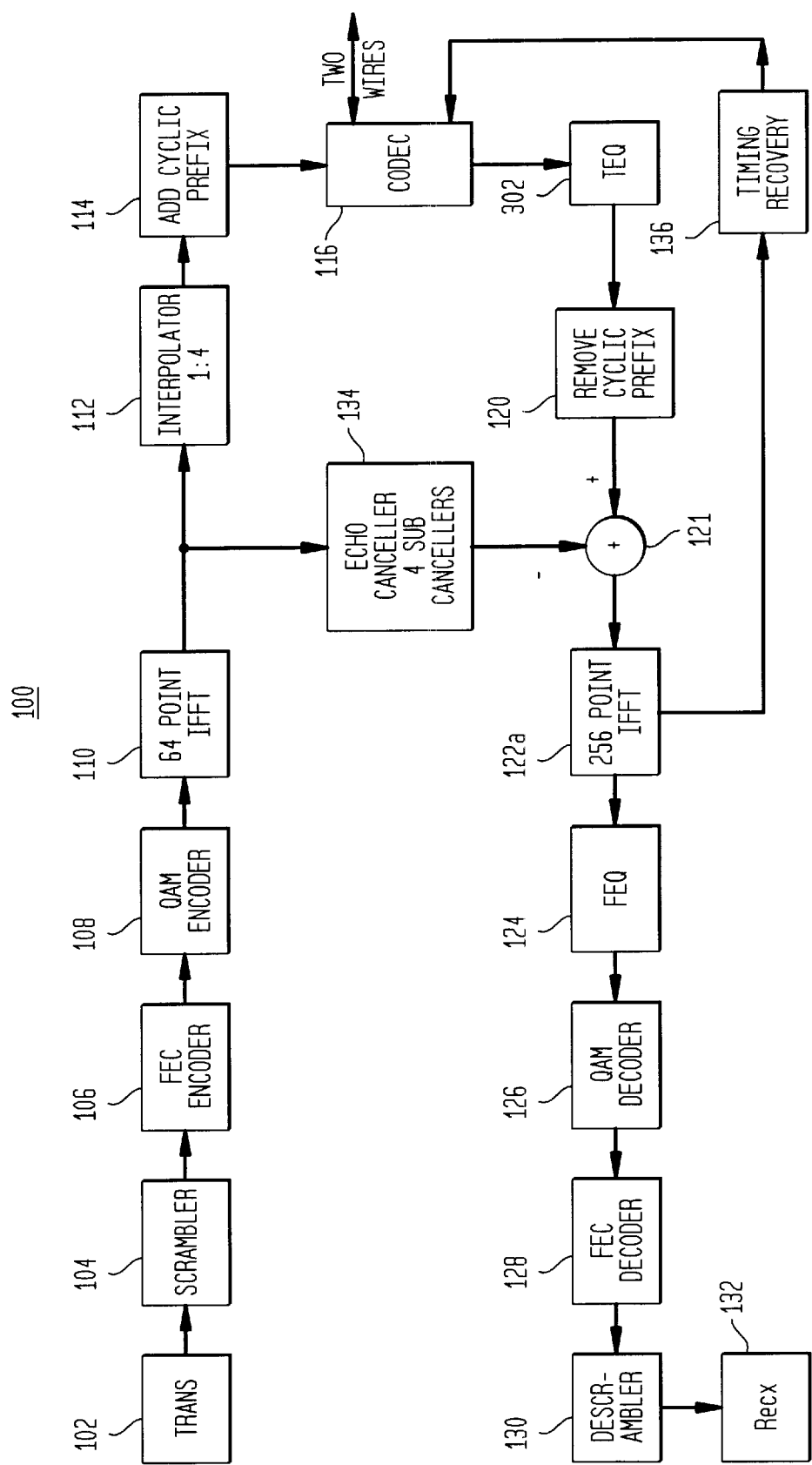
FIG. 3 is a block diagram illustrating the functions of an ADSL modem transceiver for digital multitone communications in accordance with the present invention.

FIG. 3 is a block diagram illustrating the operation of a modem transceiver for digital multitone communications in accordance with the present invention. It is essentially identical to FIG. 1, except for the new TEQ filter 302 implementing the operation described hereinabove.

To effectively implement the new computation of TEQ coefficients in accordance with equation (25) or (26), y(n) from the CODEC should be well synchronized to the transmitted signal x(n). If the received signal y(n) is not well synchronized to the transmitted signal x(n), then $R_{xy}(k)$ in equation (15) may not generate the correct value and the TEQ coefficients obtained would not be an optimal solution. Accordingly, it is important to accurately establish symbol synchronization to achieve the best performance of the above algorithm.

A technique for symbol synchronization will now be discussed. Let us consider handshaking between two DSL modems. The Central Office (CO) modem sends the C-REVERB2 signal (see ITU-T G.992.2 specification for definitions of variables) to the subscriber's modem. The subscriber's modem uses the C-REVERB2 signal to perform symbol synchronization and compute the TEQ coefficients simultaneously. In order to find the symbol synchronization, a cross correlation technique is employed as $$b_{xy}(m) = \sum_{n=0}^{N} x(n)y(n+m) = \sum_{n=0}^{N} x(n) \sum_{k=0}^{N} h(k)x(n+m-k)$$
$$= \sum_{k=0}^{N} h(k) \sum_{n=0}^{N} x(n)x(n+m-k)$$
$$= \sum_{k=0}^{N} h(k)\phi_{xx}(m-k)$$

Eq. (27)

where N is the number of samples in one DMT symbol, $\phi_{xy}(m)$ is the cross correlation of x(n) and y(n+m), and $\phi_{xx}(m)$ is the autocorrelation of x(n) and x(n+m). Since FFT (Fast Fourier Transform) is an indispensable module in a DMT DSL modem, we can save memory and computational overhead by calculating $\phi_{xy}(m)$, $0 \leq m \leq N$, in the frequency domain (i.e., FFT). By converting both sides of equation 27 by FFT, we derive:

$$\Phi_{xy}(\omega) = FFT(\phi_{xy}(m)) = H(\omega)\Phi_{xx}(\omega) \quad \text{Eq. (28)}$$

where $H(\omega)$ is the FFT of the channel response h(k) Let x(n) be the C-REVERB2 signal and $P(\omega) = FFT(x(n))$. Then equation (28) can be written as:

$$\Phi_{xy}(\omega) = H(\omega)\Phi_{xx}(\omega) = H(\omega)P(\omega)P^*(\omega) = Y(\omega)P^*(\omega) \quad \text{Eq. (29)}$$

where $P^*(\omega)$ is the conjugate of $P(\omega)$ and $Y(\omega) = FFT(y(m))$ in equation (29). From equation (29), the cross correlation of $\phi_{xy}(m)$ for $0 \leq m \leq N$ can be easily found by employing an IFFT (Inverse Fast Fourier Transform) module as $$\phi_{xy}(m) = IFFT(\Phi_{xy}(\omega)) \quad \text{Eq. (30)}$$

$\phi_{xy}(m)$ for $0 \leq m \leq N$ in connection with a subscriber's DSL modem also can be interpreted as the impulse response of the whole channel, including (1) the transmitter filter of the CO DSL modem, (2) the characteristics of the two wires between the CO modem and the subscriber's modem, and (3) the receiving filter in the subscriber's modem.

There are many factors that determine which sample between 0 and N should be selected as the start point. Therefore, the cross correlation $R_{xy}$ and the auto-correlation $R_{yy}$ in equation (15) should be computed. Two major factors in determining the symbol synchronization are the length of the TEQ filter and the characteristics of $\phi_{xy}(m)$. The length of the TEQ filter determines how many peaks and valleys of $\phi_{xy}(m)$ will be required to get the desired performance of the TEQ coefficients. The characteristics of $\phi_{xy}(m)$ determine the spacing between the peaks and valleys.

Figure 4:
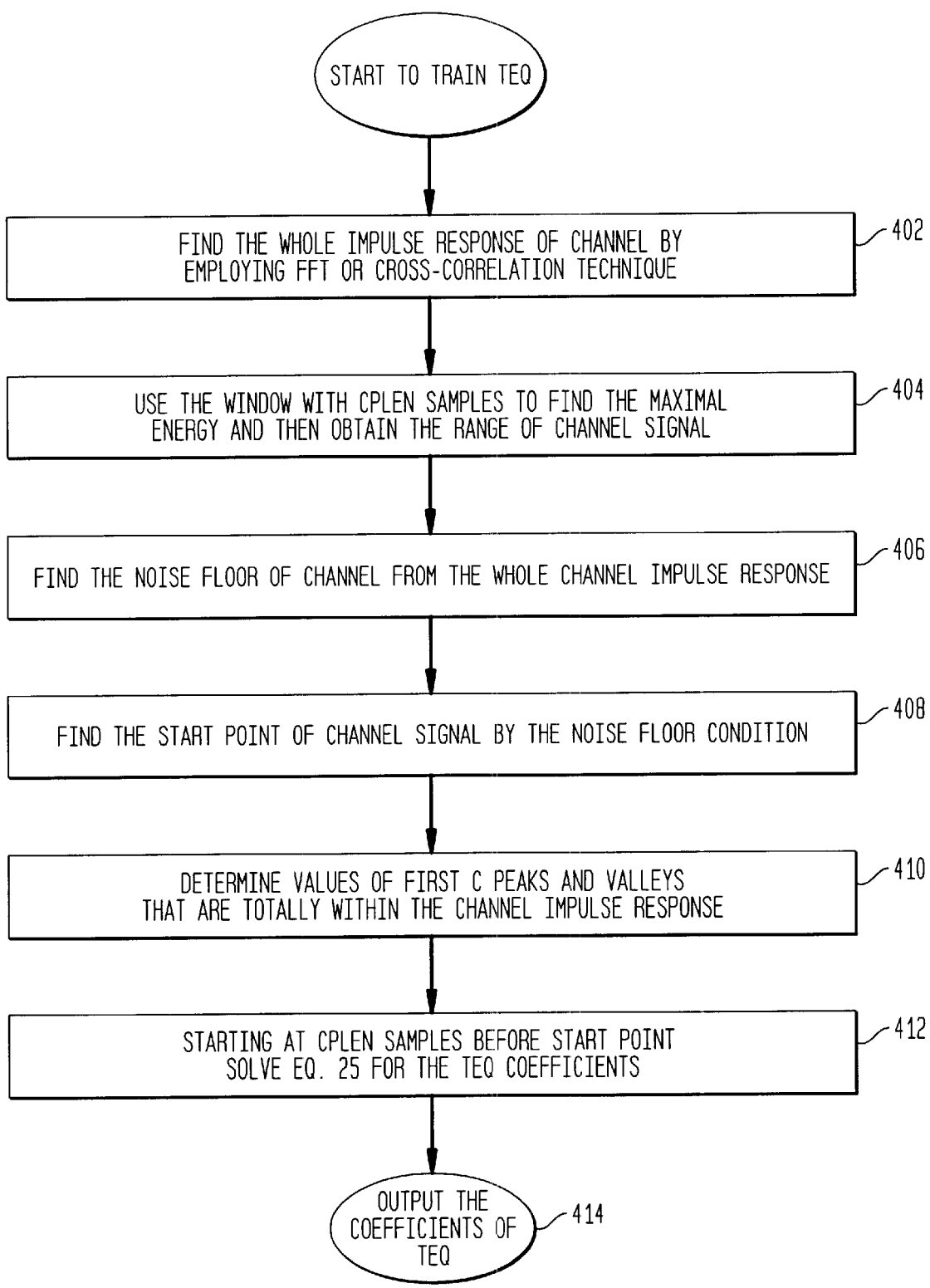
FIG. 4 is a flowchart illustrating symbol synchronization in accordance with the present invention.

A flowchart to implement the symbol synchronization in accordance with the description above is shown in FIG. 4.

In step 402, the impulse response of the channel is determined by utilizing FFT techniques or cross correlation techniques. In step 404, the impulse response $\phi_{xy}(m)$ for $0 \leq m \leq N$ passes through an energy detector with a window of the size of the channel prefix length, termed CPLEN, in order to determine the maximal energy and the range of the channel signal. In step 406, the noise floor of the channel is determined from the entire channel impulse response. The average noise floor can be calculated easily by avoiding the signal energy around the maximal energy area.

In step 408, the start point of the channel signal is determined by using the noise floor condition. Then in step 410, starting at the start point determined in step 408, the values of the first C peaks and valleys that are totally within the channel impulse response are determined, where C is a pre-determined constant based on experiment. For example, in the implementation of ITU-T G.992.2 for ADSL modems, CPLEN is 16 and the length of the TEQ is set to 6. With these conditions, the number of peaks and valleys, C, can be set to 6.

In step 412, equation (25) is used to solve for the TEQ coefficients starting at the sample that is CPLEN samples before the start point determined in step 408. In step 414, the coefficients are returned for use in the TEQ filter.

While, as an alternative, it is easy to compute all possible sets of TEQ coefficients and then choose the set that provides the best performance, such a technique is time consuming. On the other hand, the technique described herein for determining the TEQ coefficients is much less burdensome.

The above-disclosed algorithm may be implemented in any of the known ways of implementing TEQ filters, including, but not limited to, a programmed microprocessor, a micro controller, a state machine, combinatorial logic or any combination of the aforementioned. Thus, in accordance with the present invention, an efficient method and apparatus for calculating the coefficients for a time domain equalization filter is provided along with an efficient frequency domain apparatus and method for symbol synchronization.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. A method of generating coefficients for performing time domain equalization on a digital multitone signal comprising a plurality of symbols received from a transmitter over a communication channel, said method comprising the steps of:

(1) synchronizing said received digital multitone signal to a corresponding signal that was transmitted from said transmitter prior to inclusion of any channel response;

(2) determining time domain equalization coefficients, $a_{opt}$, for a TEQ filter via $$(R_{xy}{}^T R_{xx}{}^{-1} R_{xy} - R_{yy}) a_{opt} = r_2 - (R_{xy}{}^T R_{xx}{}^{-1} r_1)$$

or $$a_{opt} = (R_{xy}{}^T R_{xx}{}^{-1} R_{xy} - R_{yy})^{-1} (r_2 - R_{xy}{}^T R_{xx}{}^{-1} r_1)^-,$$

where $$R_{xx}(k) = E\{x(n)x(n+k)\} = R_{xx}(-k)$$

$$R_{xy}(k) = E\{x(n)y(n+k)\} = R_{yx}(-k)$$

$$R_{yy}(k) = E\{y(n)y(n+k)\} = R_{yy}(-k)$$

$E\{\ \}$ in the equations above represents a generalized averaging function or an ensemble average
and $$r = E\{y(n)W(n)\} = \begin{bmatrix} r_1 \\ r_2 \end{bmatrix}$$

where
W(n)=[x(n) x(n-1) x(n-2) ... x(n-(L-1))y(n-1) y(n-2) ... y(n-(K-1)]$^T$
L is the length of a cyclic prefix
K is the length of the TEQ filter
T represents a transpose function; and
(3) time domain equalizing said received signal using said coefficients determined in step (2).

2. The method as set forth in claim 1 wherein step (2) comprises solving for $a_{opt}$ using one of $$(R_{xy}{}^T V^T D_{inv} V R_{xy} - R_{yy}) a_{opt} = r_2 - (R_{xy}{}^T V^T D_{inv} V r_1)$$

or $$((V R_{xy})^T D_{inv} V R_{xy} - R_{yy}) a_{opt} = r_2 - ((V R_{xy})^T D_{inv} V r_1)^-,$$

where $V^T D_{inv} V = R_{xx}{}^{-1}$,
$V^T$ is a lower triangular matrix whose main diagonal elements are all 1's, and
$D_{inv}$ is a diagonal matrix.

3. The method as set forth in claim 2 wherein step (2) comprises the steps of:
(2.1) calculating each of $V^T$ and $D_{inv}$ once;
(2.2) storing $V^T$ and $D_{inv}$ in a memory; and
(2.3) retrieving $V^T$ and $D_{inv}$ when needed for determining $a_{opt}$.

4. The method as set forth in claim 2 wherein step (2) further comprises:
(2.4) calculating $VR_{xy}$ once and using that calculated value for each occurrence of $VR_{xy}$ in the equation.

5. The method as set forth in claim 2 wherein step (2) comprises:
(2.5) solving the equation for $a_{opt}$ by employing a Cholesky decomposition technique.

6. The method as set forth in claim 1 wherein said method is used in connection with a digital multitone receive architecture that utilizes a cyclic prefix of length L and wherein step (2) provides a coefficient wherein M≤L, where M is the impulse response length of a shortening channel utilized in said method.

7. The method as set forth in claim 6 wherein L=M.

8. The method as set forth in claim 7 wherein step (2) comprises assuming that an impulse response of a channel of said received digital multitone signal has a transfer function of:

$$H(z) = \frac{B(z)}{A(z)} = \frac{b_0 + b_1 z^{-1} + b_2 z^{-2} + \ldots + b_{(L-1)} z^{-(L-1)}}{1 + a_1 z^{-1} + a_2 z^{-2} + \ldots + a_{(K-1)} z^{-(K-1)}}.$$

9. The method as set forth in claim 6 wherein said time domain equalization is performed in connection with an asynchronous digital subscriber line.

10. The method as set forth in claim 9 wherein said time domain equalization is used in connection with a communications system in accordance with ITU-T G.992.2 specifications.

11. The method of claim 1 wherein step (1) comprises:
(1.1) cross correlating the received signal with the transmitted signal to generate an impulse response of the channel;
(1.2) determining a maximal energy window of said impulse response and a range of said channel response;
(1.3) determining a noise floor of said channel impulse response; and
(1.4) determining a start point of said channel impulse response using said noise floor.

12. The method as set forth in claim 11 wherein step (1.2) comprises passing said impulse response through an energy detector with a window of size L samples.

13. The method as set forth in claim 12 wherein step (2) is performed starting with a sample of said received signal that is L samples before said start point.

14. The method as set forth in claim 11 further comprising the steps of:
(1.5) converting said received signal to frequency domain before step (1.1); and
(1.6) converting said channel impulse response from frequency domain to time domain after step (1.1).

15. A method of recovering a signal that was received after being transmitted in digital multitone with a cyclic prefix, said method comprising the steps of:
(1) time domain equalizing said signal;
(2) removing said cyclic prefix from said signal;
(3) frequency domain equalizing said signal;
wherein step (1) comprises convolving said signal with 1+a(n) wherein a(n) is generated via $$(R_{xy}{}^T R_{xx}{}^{-1} R_{xy} - R_{yy}) a_{opt} = r_2 - (R_{xy}{}^T R_{xx}{}^{-1} r_1)$$

or $$a_{opt} = (R_{xy}{}^T R_{xx}{}^{-1} R_{xy} - R_{yy})^{-1} (r_2 - R_{xy}{}^T R_{xx}{}^{-1} r_1)^-,$$

where $$R_{xx}(k) = E\{x(n)x(n+k)\} = R_{xx}(-k)$$

$$R_{xy}(k) = E\{x(n)y(n+k)\} = R_{yx}(-k)$$

$$R_{yy}(k) = E\{y(n)y(n+k)\} = R_{yy}(-k)$$

$E\{\ \}$ in the equations above represents a generalized averaging function or an ensemble average and $$r = E\{y(n)W(n)\} = \begin{bmatrix} r_1 \\ r_2 \end{bmatrix}$$

where

W(n)=[x(n) x(n−1) x(n−2) . . . x(n−(L−1))y(n−1) y(n−2) . . . y(n−(K−1) ]$^T$

L is the length of a cyclic prefix

K is the length of a TEQ filter

T represents a transpose function.

16. The method as set forth in claim 15 wherein step (1) comprises solving for $a_{opt}$ using one of $$(R_{xy}{}^T V^T D_{inv} V R_{xy} - R_{yy})a_{opt} = r_2 - (R_{xy}{}^T V^T D_{inv} V r_1)$$

or $$((VR_{xy})^T D_{inv} V R_{xy} - R_{yy})a_{opt} = r_2 - ((VR_{xy})^T D_{inv} V r_1)^-,$$

where $V^T D_{inv} V = R_{xx}^{-1}$, $V^T$ is a lower triangular matrix whose main diagonal elements are all 1's, and $D_{inv}$ is a diagonal matrix.

17. The method as set forth in claim 16 wherein step (1) further comprises:

solving one of said equations for $a_{opt}$ by employing a Cholesky decomposition technique.

18. The method as set forth in claim 15 wherein said cyclic prefix is of a length, L, and wherein step (1) shortens a channel of said signal by M, where M≤L.

19. The method as set forth in claim 18 wherein L=M.

20. The method as set forth in claim 19 wherein step (1) further comprises assuming that an impulse response of a channel of said signal has a transfer function of:

$$H(z) = \frac{B(z)}{A(z)} = \frac{b_0 + b_1 z^{-1} + b_2 z^{-2} + \ldots + b_{(L-1)} z^{-(L-1)}}{1 + a_1 z^{-1} + a_2 z^{-2} + \ldots + a_{(K-1)} z^{-(K-1)}}.$$

21. The method as set forth in claim 18 wherein said signal is transmitted via an asynchronous digital subscriber line.

22. The method as set forth in claim 21 wherein said method is used in connection with a communications system in accordance with ITU-T specification G.992.2.

23. The method as set forth in claim 15 further comprising the steps of:

(4) determining a starting point for calculating $a_{opt}$.

24. The method of claim 23 wherein step (4) comprises:

(4.1) cross correlating the received signal with the transmitted signal to generate an impulse response of the channel;

(4.2) determining a maximal energy window of said impulse response and a range of said channel response;

(4.3) determining a noise floor of said channel impulse response; and (4.4) determining a start point of said channel impulse response using said noise floor.

25. The method as set forth in claim 24 wherein step (4.2) comprises passing said impulse response through an energy detector with a window of size L samples.

26. The method as set forth in claim 25 wherein step (1) is performed starting with a sample of said received signal that is L samples before said start point.

27. The method as set forth in claim 24 further comprising the steps of:

(4.5) converting said signal to frequency domain before step (4.1); and (4.6) converting said channel impulse response from frequency domain to time domain after step (4.1).

28. A receiver for a digital multitone modem comprising:

means for synchronizing a received digital multitone signal to a corresponding signal that was transmitted from a transmitter prior to inclusion of any channel response;

means for determining, for said received signal, time domain equalization coefficients, $a_{opt}$, for a TEQ filter via $$(R_{xy}{}^T R_{xx}^{-1} R_{xy} - R_{yy})a_{opt} = r_2 - (R_{xy}{}^T R_{xx}^{-1} r_1)$$

or $$a_{opt} = (R_{xy}{}^T R_{xx}^{-1} R_{xy} - R_{yy})^{-1}(r_2 - R_{xy}{}^T R_{xx}^{-1} r_1)^-,$$

where $R_{xx}(k) = E\{x(n)x(n+k)\} = R_{xx}(-k)$ $R_{xy}(k) = E\{x(n)y(n+k)\} = R_{yx}(-k)$ $R_{yy}(k) = E\{y(n)y(n+k)\} = R_{yy}(-k)$ E{ } in the equations above represents a generalized averaging function or an ensemble average and $$r = E\{y(n)W(n)\} = \begin{bmatrix} r_1 \\ r_2 \end{bmatrix}$$

where

W(n)=[x(n) x(n−1) x(n−2) . . . x(n−(L−1))y(n−1) y(n−2) . . . y(n−(K−1)]$^T$

L is the length of a cyclic prefix

K is the length of the TEQ filter

T represents a transpose function; and means for time domain equalizing said received signal using said coefficients.

29. The receiver as set forth in claim 28 wherein said means for determining time domain equalization coefficients comprises solving for $a_{opt}$ using one of $$(R_{xy}{}^T V^T D_{inv} V R_{xy} - R_{yy})a_{opt} = r_2 - (R_{xy}{}^T V^T D_{inv} V r_1)$$

or $$((VR_{xy})^T D_{inv} V R_{xy} - R_{yy})a_{opt} = r_2 - ((VR_{xy})^T D_{inv} V r_1)^-,$$

where $V^T D_{inv} V = R_{xx}^{-1}$, $V^T$ is a lower triangular matrix whose main diagonal elements are all 1's, and $D_{inv}$ is a diagonal matrix.

30. The receiver as set forth in claim 29 wherein said means for determining time domain equalization coefficients solves the equation for $a_{opt}$ by employing a Cholesky decomposition technique.

31. The receiver as set forth in claim 28 wherein said receiver is used in connection with a digital multitone receive architecture that utilizes a cyclic prefix of length L and wherein said means for determining time domain equalization coefficients provides a coefficient wherein M≤L, where M is the impulse response length of a shortening channel utilized in said method.

32. The receiver as set forth in claim 31 wherein L=M.

33. The receiver as set forth in claim 32 wherein said means for determining time domain equalization coefficients assumes that an impulse response of a channel of said received digital multitone signal has a transfer function of:

$$H(z) = \frac{B(z)}{A(z)} = \frac{b_0 + b_1 z^{-1} + b_2 z^{-2} + \ldots + b_{(L-1)} z^{-(L-1)}}{1 + a_1 z^{-1} + a_2 z^{-2} + \ldots + a_{(K-1)} z^{-(K-1)}}.$$

34. The receiver as set forth in claim 31 wherein said receiver is used in connection with an asynchronous digital subscriber line.

35. The receiver as set forth in claim 34 wherein said receiver is used in connection with a communications system in accordance with ITU-T specification G.992.2.

36. The receiver as set forth claim 28 wherein said means for synchronizing comprises:

means for cross correlating the received signal with the transmitted signal to generate an impulse response of the channel;

means for determining a maximal energy window of said impulse response and a range of said channel response;

means for determining a noise floor of said channel impulse response; and means for determining a start point of said channel impulse response using said noise floor.

37. The receiver as set forth in claim 36 wherein said means for determining a maximal energy window comprises means for passing said impulse response through an energy detector with a window of size L samples.

38. The receiver as set forth in claim 36 wherein said means for synchronizing comprises:

means for converting said received signal to frequency domain before cross correlating the received signal with the transmitted signal; and means for converting said channel impulse response from frequency domain to time domain after cross correlating the received signal with the transmitted signal.

\* \* \* \* \*